US010405042B2

(12) United States Patent
Gerhards et al.

(10) Patent No.: US 10,405,042 B2
(45) Date of Patent: Sep. 3, 2019

(54) TELEVISION BROADCAST DYNAMIC RECORDING CALIBRATION

(71) Applicant: DISH Technologies L.L.C., Englewood, CO (US)

(72) Inventors: Keith Gerhards, Parker, CO (US); Danny J. Minnick, Castle Rock, CO (US)

(73) Assignee: DISH Technologies L.L.C., Englewood, CO (US)

(*) Notice: Subject to any disclaimer, the term of this patent is extended or adjusted under 35 U.S.C. 154(b) by 135 days.

(21) Appl. No.: 15/068,257

(22) Filed: Mar. 11, 2016

(65) Prior Publication Data

US 2017/0264956 A1 Sep. 14, 2017

(51) Int. Cl.

| | |
|---|---|
| ***H04N 5/76*** | (2006.01) |
| ***H04N 21/458*** | (2011.01) |
| ***H04N 21/433*** | (2011.01) |
| ***H04N 21/2187*** | (2011.01) |
| ***H04N 21/262*** | (2011.01) |
| ***H04N 21/442*** | (2011.01) |
| ***H04N 21/24*** | (2011.01) |
| ***H04N 21/6547*** | (2011.01) |
| ***H04N 21/6587*** | (2011.01) |

(52) U.S. Cl.

CPC ..... *H04N 21/4583* (2013.01); *H04N 21/2187* (2013.01); *H04N 21/2407* (2013.01); *H04N 21/26283* (2013.01); *H04N 21/26291* (2013.01); *H04N 21/4334* (2013.01); *H04N 21/442* (2013.01); *H04N 21/458* (2013.01); *H04N 21/6547* (2013.01); *H04N 21/6587* (2013.01)

(58) Field of Classification Search

CPC ......... H04N 21/26283; H04N 21/4334; H04N 21/442; H04N 21/4583; H04N 21/6587; H04N 21/6547; H04N 21/458; H04N 21/26291; H04N 21/2407; H04N 21/2187

USPC ................................ 386/292, 299, 297, 293

See application file for complete search history.

(56) References Cited

U.S. PATENT DOCUMENTS 5,900,912 A * 5/1999 Nishigaki ........... H04N 7/0887 348/460
6,272,117 B1 * 8/2001 Choi ................ H04W 74/0866 370/330

(Continued)

*Primary Examiner* — Helen Shibru

(74) *Attorney, Agent, or Firm* — Kilpatrick Townsend & Stockton LLP

(57) ABSTRACT

Embodiments described herein provide various techniques for dynamically calibrating digital video recordings of television broadcasts based on analyzes of changes to time data and channel data associated with live television broadcasts. In various embodiments, television receivers may transmit sets of recording schedule data to television broadcast monitor devices, which may receive time data corresponding to live broadcast television programs from various data sources, such as satellite or cable television service providers, social media servers, user devices, and other data sources. Television broadcast monitor devices and/or television receivers may receive and analyze the live television broadcast time data and channel data, and may determine updated recording schedule data which may be used to dynamically reprogram the digital video recorders associated with one or more television receivers.

19 Claims, 10 Drawing Sheets

(56) References Cited

U.S. PATENT DOCUMENTS

| | | | | |
|---|---|---|---|---|
| 8,588,590 | B1 * | 11/2013 | Kotab | H04N 5/765<br>386/230 |
| 9,032,463 | B2 * | 5/2015 | Kim | H04N 7/17318<br>725/110 |
| 9,398,248 | B2 * | 7/2016 | Merzon | H04N 5/76 |
| 9,479,738 | B2 * | 10/2016 | Hwang | H04N 7/17318 |
| 2004/0117442 | A1 * | 6/2004 | Thielen | G10H 1/0083<br>709/203 |
| 2005/0169349 | A1 * | 8/2005 | Hwang | H04B 7/2628<br>375/130 |
| 2008/0271075 | A1 * | 10/2008 | Kawai | H04H 60/72<br>725/39 |
| 2009/0296000 | A1 * | 12/2009 | Pal | H04N 7/165<br>348/725 |
| 2010/0040345 | A1 * | 2/2010 | Beach | H04N 5/44543<br>386/296 |
| 2012/0020651 | A1 * | 1/2012 | Gilson | H04N 5/782<br>386/296 |
| 2017/0264947 | A1 * | 9/2017 | Gerhards | H04N 21/6143 |
| 2017/0264965 | A1 * | 9/2017 | Gerhards | H04N 21/6334 |

* cited by examiner

200

210

Recording Schedule Data

| Program Name | Channel | Start Time | End Time |
|---|---|---|---|
| Live Sport ABC | 9 | 9:00 pm | 11:00 pm |

Updated Recording Schedule Data

| Program Name | Channel | Start Time | End Time |
|---|---|---|---|
| Live Sport ABC | 9 | 9:00 pm | 10:25 pm |

FIG. 5A

Recording Schedule Data

| Program Name | Channel | Start Time | End Time |
|---|---|---|---|
| Live Speech | 10 | 9:00 pm | 11:00 pm |

Updated Recording Schedule Data

| Program Name | Channel | Start Time | End Time |
|---|---|---|---|
| Live Speech | 10 | 8:50 pm | 10:50 pm |

FIG. 5B

Recording Schedule Data

| Program Name | Channel | Start Time | End Time |
|---|---|---|---|
| Live Event | 7 | 6:00 pm | 8:00 pm |
| TV Show | 7 | 8:00 pm | 9:00 pm |
| TV Show | 7 | 9:00 pm | 9:30 pm |

Updated Recording Schedule Data

| Program Name | Channel | Start Time | End Time |
|---|---|---|---|
| Live Event | 7 | 6:00 pm | 8:40 pm |
| TV Show | 7 | 8:40 pm | 9:40 pm |
| TV Show | 7 | 9:40 pm | 10:10 pm |

FIG. 5C

Recording Schedule Data

| Program Name | Channel | Start Time | End Time |
|---|---|---|---|
| TV Show ABC | 2 | 7:00 pm | 8:00 pm |

Updated Recording Schedule Data

| Program Name | Channel | Start Time | End Time |
|---|---|---|---|
| TV Show ABC | 2 | 7:00 pm | 7:24 pm |
| TV Show ABC | 2 | 7:41 pm | 8:17 pm |

FIG. 5D

Recording Schedule Data

| Program Name | Channel | Start Time | End Time |
|---|---|---|---|
| TV Show ABC | 2 | 7:00 pm | 8:00 pm |

Updated Recording Schedule Data

| Program Name | Channel | Start Time | End Time |
|---|---|---|---|
| TV Show ABC | 2 | 7:00 pm | 7:24 pm |
| TV Show ABC | 2 | 7:41 pm | 8:00 pm |

FIG. 5E

Recording Schedule Data

| Program Name | Channel | Start Time | End Time |
|---|---|---|---|
| Live Concert | 13 | 6:00 pm | 9:00 pm |
| TV Program | 13 | 9:00 pm | 10:00 pm |

Updated Recording Schedule Data

| Program Name | Channel | Start Time | End Time |
|---|---|---|---|
| Live Event | 13 | 6:00 pm | 9:37 pm |
| TV Program | 14 | 9:00 pm | 10:00 pm |

FIG. 5F

Recording Schedule Data

| Program Name | Channel | Start Time | End Time |
|---|---|---|---|
| Live Game 1 | 20 | 1:00 pm | 4:00 pm |
| Live Game 2 | 20 | 4:00 pm | 7:00 pm |

Updated Recording Schedule Data

| Program Name | Channel | Start Time | End Time |
|---|---|---|---|
| Live Game 1 | 20 | 1:00 pm | 4:00 pm |
| Live Game 1 | 44 | 4:00 pm | 5:15 pm |
| Live Game 2 | 20 | 4:00 pm | 7:00 pm |

FIG. 5G

TELEVISION BROADCAST DYNAMIC RECORDING CALIBRATION

BACKGROUND OF THE INVENTION

The advent of the digital video recorder and the availability of high-capacity and affordable computer-readable storage devices have made available many possibilities for television programming service providers and viewers alike. Television viewers have come to expect flexibility and convenience with respect to the recording and/or accessing of content via their television receivers.

BRIEF SUMMARY OF THE INVENTION

Aspects described herein provide various techniques for dynamically calibrating digital video recordings of television broadcasts based on analyses of changes to time data and channel data for live television broadcasts. In various embodiments, television receivers may transmit sets of recording schedule data to television broadcast monitor devices, which may include television provider servers, user devices, social media servers, or other devices configured to monitor live television broadcasts. Television receivers may include devices such as televisions, set-top boxes, gaming consoles, network routers, personal computers, and any other device capable of receiving and recording a television broadcast signal. Television broadcast monitor devices may receive time data corresponding to live broadcast television programs from various data sources, for example, satellite or cable television service providers, social media servers, and other data sources. Television broadcast monitor devices and/or television receivers may receive and analyze the live television broadcast time data and may determine updated recording schedule data which may be used to dynamically reprogram the digital video recorders associated with one or more television receivers.

Additional techniques described herein include analyzing time data and/or channel data for live broadcast television programs, which include determinations that the scheduled times and/or the scheduled channels of one or more recordings at a television receiver should be modified. Television receivers may determine, or may be instructed to perform, a recalibration of a digital video recorder (e.g., via reprogramming or reconfiguring) operating at the television receiver. In some cases, television broadcast monitor devices and/or television receivers may determine that the receiver is either unauthorized to or incapable of recording the television programs in accordance with the updated recording schedule data. For example, the broadcast channel scheduled for a program may be changed to a channel not authorized for reception by the television receiver, or the time scheduled for a program may change to a time conflicting with one or more other scheduled recordings. In such cases, the television receiver may be configured to generate and transmit notifications via presentation devices or user devices, and to receive and execute instructions in response to address such conflicts.

BRIEF DESCRIPTION OF THE DRAWINGS

The present invention is described in conjunction with the appended figures:

FIGS. 5A-5G are examples of recording schedule data and corresponding updated recording schedule data that may be generated in various different scenarios, in accordance with one or more embodiments of the disclosure.

DETAILED DESCRIPTION OF THE INVENTION

Figure 1:
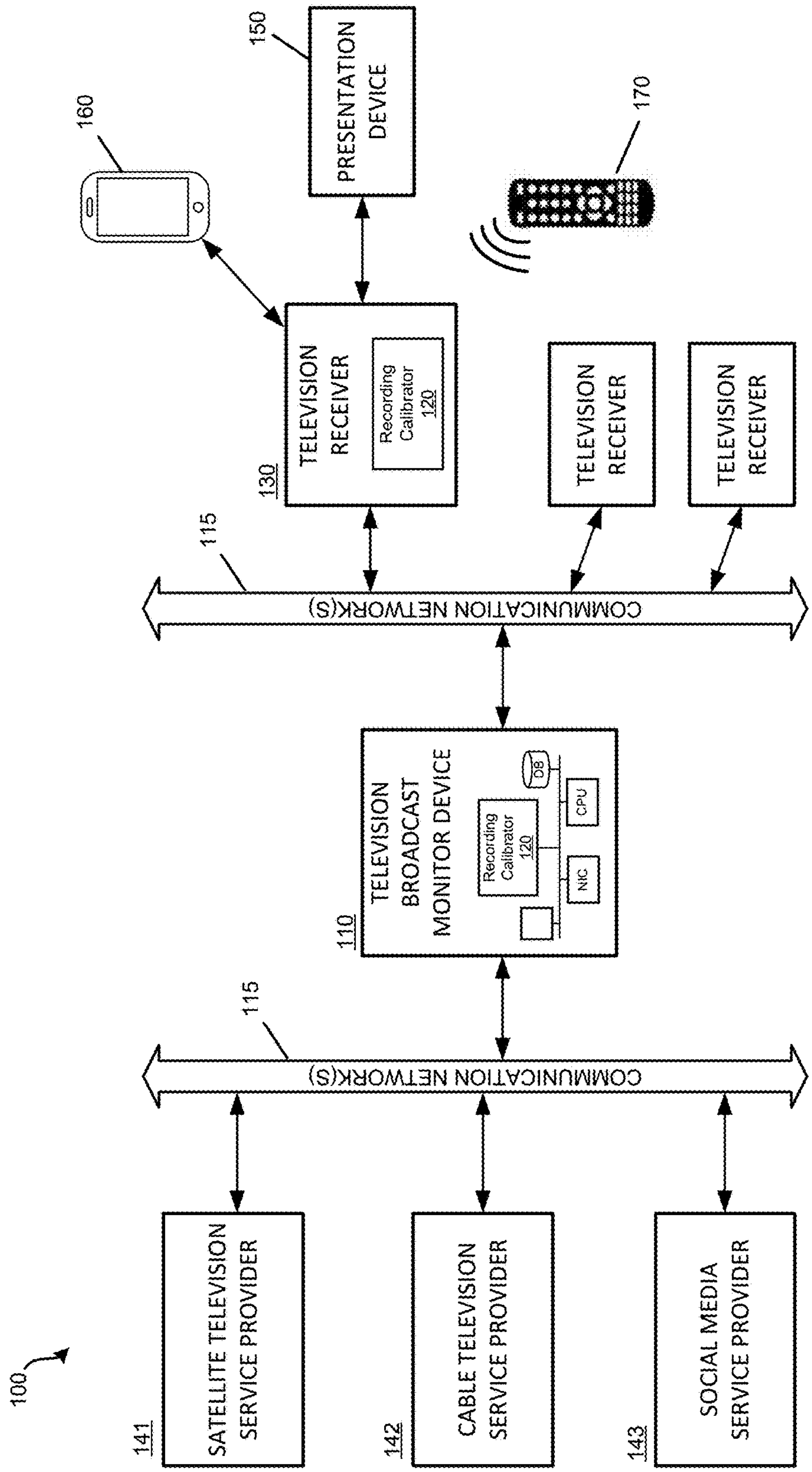
FIG. 1 is a block diagram illustrating a television broadcast recording system, according to one or more embodiments of the present disclosure.

Various techniques (e.g., systems, methods, computer-program products tangibly embodied in a non-transitory computer-readable storage medium, etc.) are described herein for dynamically calibrating digital video recordings of television broadcasts based on analyses of time data corresponding to live television broadcasts. In some embodiments, one or more television receivers may transmit respective sets of recording schedule data to a television broadcast monitor device, such as a television provider server, user device, social media server, or other device configured to monitor live television broadcast streams. In various examples, television receivers may include devices such as televisions, set-top boxes, gaming consoles, network routers, personal computers, and any other device capable of receiving and recording a television broadcast signal. Television broadcast monitor devices may receive time data corresponding to live broadcast television programs from various data sources, for example, satellite or cable television service providers, social media servers, and other data sources. A television broadcast monitor device and/or television receiver may receive and analyze the live television broadcast time data and may determine updated recording schedule data for one or more television receivers, which may be used to dynamically reprogram the digital video recorders associated with the television receivers.

In some examples, an analysis of the time data for a live broadcast television program may indicate that the scheduled times and/or the scheduled channels of one or more scheduled recordings at a television receiver should be modified. Television receivers may determine, or may be instructed to perform, a recalibration of a digital video recorder (e.g., via reprogramming or reconfiguring) operating at the television receiver. In some cases, television broadcast monitor devices and/or television receivers may determine that the receiver is either unauthorized to or incapable of recording the television programs in accordance with the updated recording schedule data. For example, the broadcast channel scheduled for a program may be changed to a channel not authorized for reception by the television receiver, or the time scheduled for a program may change to a time conflicting with one or more other scheduled recordings. In such cases, the television receiver may be configured to generate and transmit notifications via presentation devices or user devices, and to receive and execute instructions in response to address such conflicts.

The various embodiments described herein may be implemented on and within one or more different networks and systems, including satellite or terrestrial television distribution systems, telecommunications network systems, computer networks such as the Internet, cellular and other mobile networking systems, and the like. Therefore, although certain examples below are described in terms of reprogramming or reconfiguring specific types of user equipment (e.g., set-top boxes and other television receivers having digital video recorders, etc.) within specific systems (e.g., satellite television distribution systems), it should be understood that similar or identical embodiments may be implemented using other network systems and architectures (e.g., cable television networks, telecommunication networks, computer networks), as well as other user equipment and devices (e.g., personal computers, servers, routers, gaming consoles, smartphones, etc.).

Referring now to FIG. 1, an example television broadcast recording system 100 is shown on which various aspects of the present disclosure may be implemented. In this example, the television broadcast recording system 100 includes a television broadcast monitor device 110 configured to communicate with one or more live television broadcast data sources 141 and television receivers 130, in order to dynamically calibrate the scheduled digital video recordings of television broadcasts. As discussed below, in some embodiments, television receivers 130 may transmit recording schedule data to a television broadcast monitor device 110, which may receive and analyze the recording schedule data along in conjunction with live television broadcast time data received from various data sources 141-143. The television broadcast monitor device 110 and/or television receivers 130 may determine updated recording schedule data applicable to the television receiver 130, and may dynamically reprogram digital video recorders within (or associated with) the television receivers 130. Programs recorded in accordance with the updated recording schedule data, as well as various interactive notifications described herein, may be displayed via presentation devices 150 and/or user devices 160. In order to perform these features and the additional functionality described below, each of the components and subcomponents shown in example system 100, such as television broadcast monitor device 110, television receiver 130, data sources 141-143, and presentation device 150, may correspond to a single computing device or server, or to a complex computing system including a combination of computing devices, storage devices, network components, etc. Each of these components and their respective subcomponents may be implemented in hardware, software, or a combination thereof. The components shown in system 100 may communicate via communication networks 115, either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the data sources 141-143, monitoring device 110, television receiver 130, and other components within television broadcast recording system 100.

Television broadcast monitoring device 110 may be implemented as a single computing server, or a computing system including a combination of multiple computing devices, storage devices, network components, etc. In various embodiments, a television broadcast monitoring device 110 may include various specialized hardware and/or software components for receiving and analyzing recording schedules from television receivers 130, and for receiving and analyzing live television broadcast time data from various data sources 140. For example, television broadcast monitoring device 110 may receive recording schedule data from a television receiver 130, identify one or more live television programs associated with the schedule data, track/monitor the live television broadcast signals for the live television programs, and determine changes to the recording schedule data based on updated time data for the broadcast of the live television programs. In some cases, the television broadcast monitoring device 110 may determine and transmit updated recording schedule data to the television receivers 130, including updated program times and/or updated program channels. To perform such features, the television broadcast monitoring device 110 may include one or more internal data stores and/or external data stores (e.g., external storage systems, database servers, file-based storage, cloud storage systems, etc.) configured to store recording schedule data, and to receive and track time data from live television broadcasts. In some embodiments, such data stores may reside in a back-end server farm, storage cluster, and/or storage-area network (SAN). The television broadcast monitoring device 110 also may include one or more network interface components, as well as programmatic or graphical user interfaces (e.g., software services, application programming interfaces, etc.) to facilitate communication between the device 110 and various data sources 141-143 and television receivers 130.

As shown in this example, the television broadcast monitoring device 110 may be configured to communicate with data source devices 141-143 and television receivers 130 over one or more communication networks 115. For instance, a recoding calibrator component or service 120 may be implemented within television broadcast monitoring devices 110 and/or television receivers 130 to perform the functionality and communications described below. Each television receiver 130 may correspond to a primary television receiver (PTR) 210 including digital video recording functionality, described below in more detail in FIGS. 2-3. However, in other examples, television receivers 130 may correspond to personal computers, mobile devices (e.g., tablet computers, smartphones, etc.), and/or any other device capable of receiving, presenting, and/or storing live content. Data sources 141-143 may include any number of servers and other devices configured to monitor live television broadcast and transmit associated data to the television broadcast monitoring device 110.

In this example, data sources 141-143 include a satellite television service provider 141, a cable television service provider 142, and a social media service provider 143. Although three example data sources 141-143 are shown in FIG. 1, it should be understood that these examples are illustrative only and non-limiting, and that any number of different data sources may be used in other embodiments. As discussed in more detail below, data source devices 141-143 may operate individually or in combination to track live broadcasts of television programs, record and transmit updated broadcast data (e.g., updated starting, ending times, and channels of live television programs and other television programs that are broadcast adjacent to the live television programs or are otherwise affected by the live television programs) to the television broadcast monitoring device 110. For example, data sources 141 and 142 may correspond to content providers of live television signals or data streams (e.g., satellite hubs, cable headends, Internet servers, etc.), and thus data sources 141 and 142 may have direct and immediate access to any time and/or broadcast channel updates associated with the live television broadcasts that these sources are providing. In contrast, social media service provider 143 may correspond to a separate communication service configured to receive and/or monitor data feeds in real-time from users of social networks and/or other communication services such as Twitter® feeds, Facebook® updates, web feeds such as Rich Site Summary (RSS) feeds, and/or real-time updates from one or more third party information sources, relating to time or broadcast channel updates associated with live television broadcasts.

Although the television broadcast monitoring device 110, the television receiver 130, and each data source device 141-143 are illustrated as a standalone computer systems in this example, as discussed below, these components may be implemented within and/or integrated into one or more servers or devices of various content distribution systems and other computing architectures. For example, as discussed below in reference to FIGS. 2 and 3, television broadcast monitoring device 110 may be implemented within one or more devices of a satellite television distribution system 200. For example, the television broadcast monitoring device 110 may be implemented via one or more recording calibrators 120 (e.g., broadcast recording calibration services 220) within servers 218 and/or within television receivers 210 of the satellite television distribution system 200. In other embodiments, the television broadcast monitoring device 110 may be implemented within other content distribution systems, such as terrestrial television distribution systems, telecommunications network systems, LAN or WAN computer networks (e.g., the Internet), cellular and other mobile networking systems, and any other computing environment configured to provide live content. In any of these examples, the television broadcast monitoring device 110 may be implemented within (or integrated into) one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

In any of these implementations, the television broadcast monitoring device 110 may be configured to communicate with data source devices 141-143 and television receivers 130 over one or more communication networks 115. Additionally, although television broadcast monitoring device 110, television receivers 130, and data sources 141-143 may be implemented as separate computing systems, as shown in FIG. 1, some or all of these systems may be implemented within a single device or server in certain embodiments. For example, as discussed below, a television broadcast monitoring device 110 may be implemented entirely within a television receiver 130 in some embodiments, rather than as a separate computing system. Additionally, either a television broadcast monitoring device 110 and/or a television receiver may include one or more data sources 141-143 used to receive and monitor live television broadcasts. For instance, television receivers 130 in some embodiments may be configured to "read" metadata tags embedded within the television transmission signals to determine changes in starting times, ending times, or broadcast channels of live television programs. Additionally or alternatively, television receivers 130 may be configured to receive time data relating to live television broadcasts directly from television providers, social media services, or other third-party data sources.

Television content received and/or recorded by a television receiver 130 may be presented via one or more presentation devices 150. Presentation devices 150 may correspond to televisions and other television viewing devices (e.g., home computers, tablet computers, smartphones, etc.). Additionally, the television recording system 100 may incorporate various other user equipment and devices, such as user devices 160 and remote control devices 170 configured to communicate with associated television receivers 130 and/or presentation devices 150. User devices 160 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 160 may be associated with specific television receivers 130 and/or specific user accounts of television distribution systems. As shown in FIG. 1, user devices 160 may be configured to receive data from and transmit data to an associated television receiver 130. Additionally or alternatively, user devices 160 may be configured to communicate directly with a television broadcast monitor device 110 and/or data sources 141-143, so that transmissions of updated recording schedule data, user notifications, recorder reprogramming instructions, and the like, may potentially bypass the television receiver 130 in some embodiments.

Different presentations devices 150, user devices 160, and remote control devices 170 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 150-170 may support different input and output capabilities, and thus different types of user notifications and user inputs in response to notifications may be compatible or incompatible with certain devices 150-170. For example, certain notifications generated and output by a television broadcast monitor device 110, television receiver, or data source 140 may require specific types of processors, graphics components, and network components in order to be displayed (or displayed optimally) on a user device 160. Additionally, different types of user notifications may include different interactive user response features that require various specific input capabilities for presentation devices 150, user devices 160, and remote control devices 170, such as keyboards, mouses, touchscreens, voice control capabilities, gesture recognition, and the like. In some embodiments, the content of user notifications and/or the user response components may be customized based on the capabilities of the presentation device 150 and/or user device 170 selected to output the notification. Additionally, in some cases, users may establish user-specific preferences, which may be stored in the memory of the monitor device 110 or television receiver 130, for outputting specific types of user notifications to specific types of presentation devices 150 and/or user devices 160.

The television broadcast monitor device 110, television receivers 130, data source devices or servers 141-143, presentation devices 150, and user devices 160 each may include the necessary hardware and software components to establish network interfaces and transmit/receive television signals or data streams, television program recording schedule data, user notifications, recalibrating or reprogramming instructions, etc. Some or all of these devices may include security features and/or specialized hardware (e.g., hardware-accelerated SSL and HTTPS, WS-Security, firewalls, etc.) in order to prevent hacking and other malicious access attempts within the system 100. In some cases, the television broadcast monitor device 110 may communicate with television receivers 130 and/or user devices 160 using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the monitoring device 110, television receivers 130, data sources 141-143, and user devices 160. SSL or TLS may use HTTP or HTTPS to provide authentication and confidentiality.

Communication network(s) 115, through which the television broadcast monitoring device 110, data sources 141-143, television receivers 130, and/or user devices 160 may communicate, may include local area networks (LANs), wide area networks (WANs) (e.g., the Internet), and/or various wireless telecommunications networks. For example, when a recording calibrator component 120 is implemented within a television receiver 130, wireless router, modem, or other local user equipment, then communication network 115 may include wireless local area networks (WLANs) or other short-range wireless technologies such as Bluetooth®, mobile radio-frequency identification (M-RFID), and/or other such communication protocols. In other examples, when at least a portion or component of a television broadcast monitoring device 110 is implemented remotely at a central server, satellite hub, cable headend, or the like, then communication network 115 may include one or more WANs (e.g., the Internet), satellite communication networks, or terrestrial cable networks, and various cellular and/or telecommunication networks (e.g., 3G, 4G or EDGE (enhanced data rates for global evolution), WiFi (IEEE 802.11 family standards, or other mobile communication technologies), or any combination thereof. Additionally, for communication between mobile user devices 160 located remotely to their associated television receivers 130 and/or monitoring devices 110, then communication networks 115 may include WANs, satellite networks, terrestrial cable networks, and/or cellular or other mobile telecommunication networks, etc.

As discussed above, various components of the television recording system 100 may be implemented as standalone hardware and software systems, and may be implemented within one or more different computer network systems and architectures. For example, in reference to FIGS. 2 and 3, the television recording system 100 may be implemented using one or more broadcast recording calibration services 220 executing within server hardware 218 and/or television receiver devices 210 within a satellite television distribution system 200. However, in other embodiments, the components of a television recording system 100 may be incorporated within various different types of content distribution systems. For example, corresponding embodiments to those described in FIGS. 2 and 3 may be implemented within terrestrial cable television distribution systems, telecommunications network systems, LAN or WAN computer networks (e.g., the Internet), cellular and other mobile networking systems, and the like. In any of these examples, a television recording system 100 may be implemented within (or integrated into) one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services. Thus, although not so limited, an appreciation of various aspects of the present disclosure may be gained from the following discussion in connection with FIGS. 2 and 3.

Figure 2:
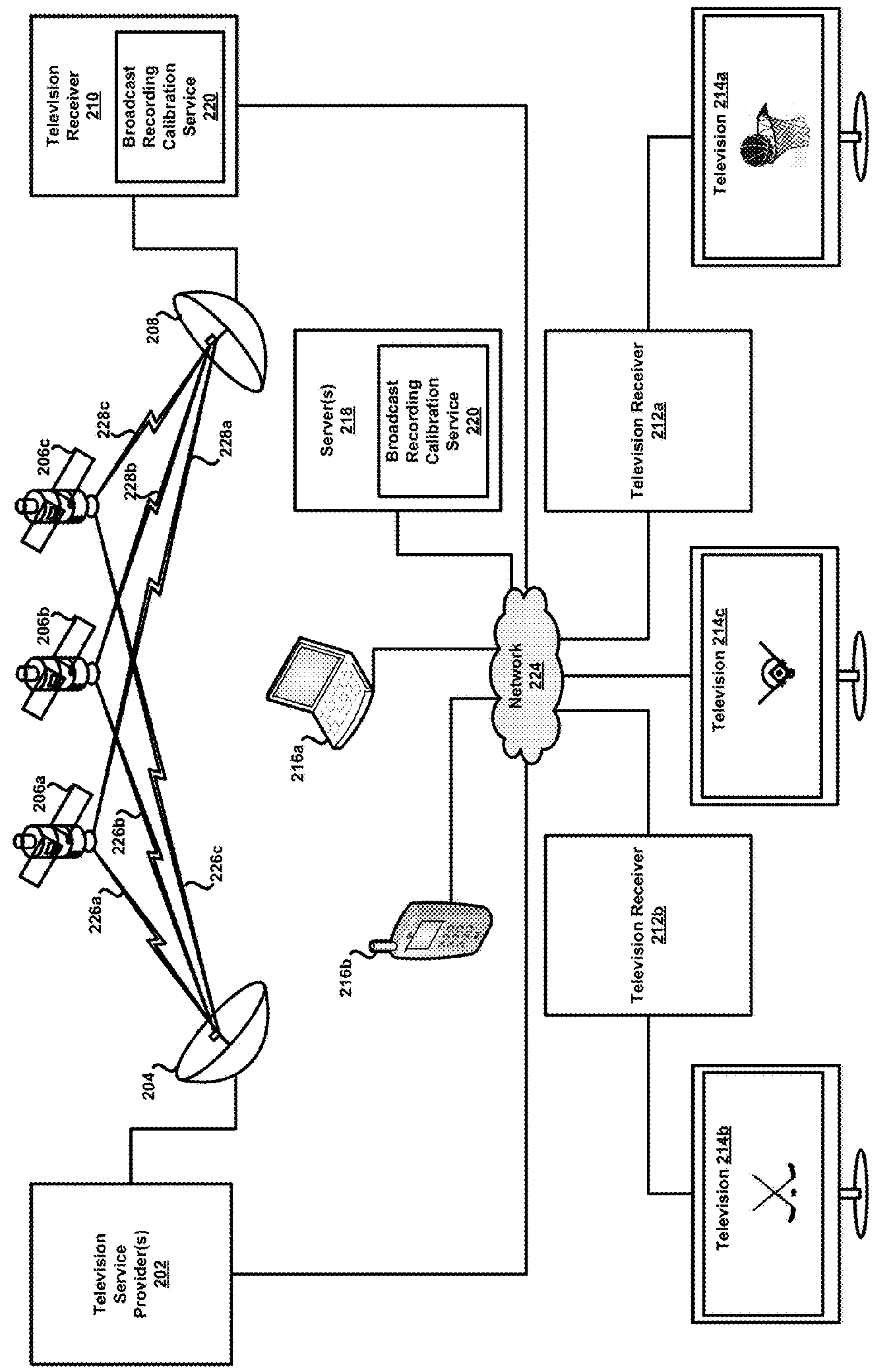
FIG. 2 is a block diagram illustrating an example satellite television system, according to one or more embodiments of the present disclosure.

Referring now to FIG. 2, an example satellite television distribution system 200 is shown in accordance with the principles of the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one server 218 that may in general be associated with or operated by or implemented by the service provider 202. Additionally, the PTR 210 and/or the server 218 may include or otherwise exhibit an instance of broadcast recording calibration service module 220. The recording calibration modules 220 may be implemented and configured using various hardware and software components discussed above, in order to support the features and perform the functionality of the various television broadcast recording systems 110 discussed above in reference to FIG. 1. Thus, one or more recording calibration modules 220 in this embodiment may be configured to, for example, receive and analyze live television broadcast time data, determine updated recording schedule data for television receivers, and dynamically reprogram associated digital video recorders associated with the television receivers.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212*a-b*, as described throughout may generally be any type of television receiver, television converter, etc., such as a set-top box (STB) for example. In another example, the PTR 210, and the STRs 212*a-b*, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212*a-b* and televisions 214*a-c*, and possibly the computing devices 216*a-b*, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206*a-c* may each be configured to receive uplink signals 226*a-c* from the satellite uplink 204. In this example, each the uplink signals 226*a-c* may contain one or more transponder streams of particular data or content, such as one or more particular television channels, as supplied by the service provider 202. For example, each of the respective uplink signals 226*a-c* may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206*a-c*.

Further, different media content may be carried using different transponders of a particular satellite (e.g., satellite 206*a*); thus, such media content may be transmitted at different frequencies and/or different frequency ranges. For example, a first and second television channel may be carried on a first carrier frequency over a first transponder of satellite 206*a*, and a third, fourth, and fifth television channel may be carried on second carrier frequency over a first transponder of satellite 206*b*, or, the third, fourth, and fifth television channel may be carried on a second carrier frequency over a second transponder of satellite 206*a*, and etc. Each of these television channels may be scrambled such that unauthorized persons are prevented from accessing the television channels.

The satellites 206*a-c* may further be configured to relay the uplink signals 226*a-c* to the satellite dish 208 as downlink signals 228*a-c*. Similar to the uplink signals 226*a-c*, each of the downlink signals 228*a-c* may contain one or more transponder streams of particular data or content, such as various encoded and/or at least partially electronically scrambled television channels, on-demand programming, etc., in accordance with an allotted carrier frequency and bandwidth. The downlink signals 228*a-c*, however, may not necessarily contain the same or similar content as a corresponding one of the uplink signals 226*a-c*. For example, the uplink signal 226*a* may include a first transponder stream containing at least a first group or grouping of television channels, and the downlink signal 228*a* may include a second transponder stream containing at least a second, different group or grouping of television channels. In other examples, the first and second group of television channels may have one or more television channels in common. In sum, there may be varying degrees of correlation between the uplink signals 226*a-c* and the downlink signals 228*a-c*, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206*a-c*. For example, the satellite dish 208 may be configured to receive particular transponder streams, or downlink signals 228*a-c*, from one or more of the satellites 206*a-c*. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214*c* for display thereon. For example, the satellite dish 208 and the PTR 210 may, respectively, be configured to receive, decode, and relay at least one premium HD-formatted television channel to the television 214*c*. Programming or content associated with the HD channel may generally be presented live, or from a recording as previously stored on, by, or at the PTR 210. Here, the HD channel may be output to the television 214*c* in accordance with the HDMI/HDCP content protection technologies. Other examples are however possible.

Further, the PTR 210 may select via tuner, decode, and relay particular transponder streams to one or both of the STRs 212*a-b*, which may in turn relay particular transponder streams to a corresponding one of the televisions 214*a-b* for display thereon. For example, the satellite dish 208 and the PTR 210 may, respectively, be configured to receive, decode, and relay at least one television channel to the television 214*a* by way of the STR 212*a*. Similar to the above-example, the television channel may generally be presented live, or from a recording as previously stored on the PTR 210, and may be output to the television 214*a* by way of the STR 212*a* in accordance with a particular content protection technology and/or networking standard. Still further, the satellite dish 208 and the PTR 210 may, respectively, be configured to receive, decode, and relay at least one premium television channel to one or each of the computing devices 216*a-c*. Similar to the above-examples, the television channel may generally be presented live, or from a recording as previously stored on the PTR 210, and may be output to one or both of the computing devices 216*a-c* in accordance with a particular content protection technology and/or networking standard.

Figure 3:
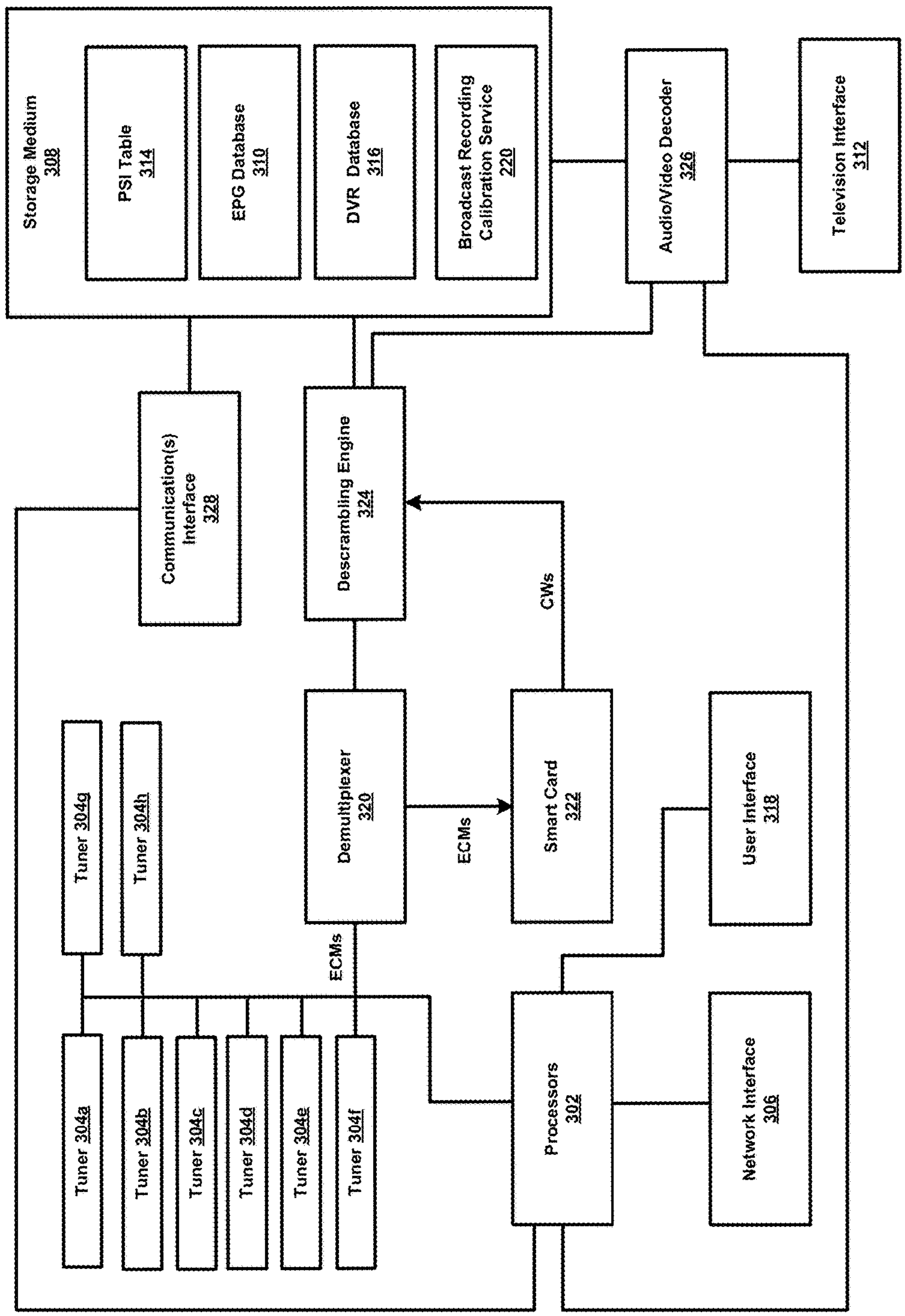
FIG. 3 is a block diagram illustrating an example television receiver device, according to one or more embodiments of the present disclosure.

Referring now to FIG. 3, an example block diagram of the PTR 210 of FIG. 2 is shown in accordance with the disclosure. In some examples, the STRs 212*a-b* may be configured in a manner similar to that of the PTR 210. In some examples, the STRs 212*a-b* may be configured and arranged to exhibit a reduced functionality as compared to the PTR 210, and may depend at least to a certain degree on the PTR 210 to implement certain features or functionality. The STRs 212*a-b* in this example may be each referred to as a "thin client."

The PTR 210 may include one or more processors 302, a plurality of tuners 304*a-h*, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites 206*a-c*. Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206*a-c*, which may be unidirectional to the PTR 210, and another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the recording calibration module 220 mentioned above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206*a-c* of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308 or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304*a-h* and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304*a-h*, television channels received via satellite may contain at least some encrypted or scrambled data. Packets of audio and video may be scrambled to prevent unauthorized users, such as nonsubscribers, from receiving television programming without paying the service provider 202. When one of the tuners 304*a-h* is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304*a-h* may be scrambled. The video and/or audio may be descrambled by the descrambling engine 324 using a particular control word. The control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing systems and devices as shown in FIG. 2 and FIG. 3, discussed further below. It is contemplated that the communication interface 328 may take or exhibit any form as desired, and may be configured in a manner so as to be compatible with a like component or element incorporated within or to a particular one of the computing systems and devices as shown in FIG. 2 and FIG. 3, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below in connection with FIG. 8.

For brevity, the PTR 210 is depicted in a simplified form, and may generally include more or fewer elements or components as desired, including those configured and/or arranged for receiving and analyzing television program recording schedule data and live television broadcast data, and for determining and implemented updated recording schedules, in accordance with the principles of the present disclosure. For example, the PTR 210 is shown in FIG. 3 to include an instance of the recording calibration module 220 as mentioned above in connection with FIG. 2. While shown stored to the storage medium 308 as executable instructions, the recording calibration module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4A:
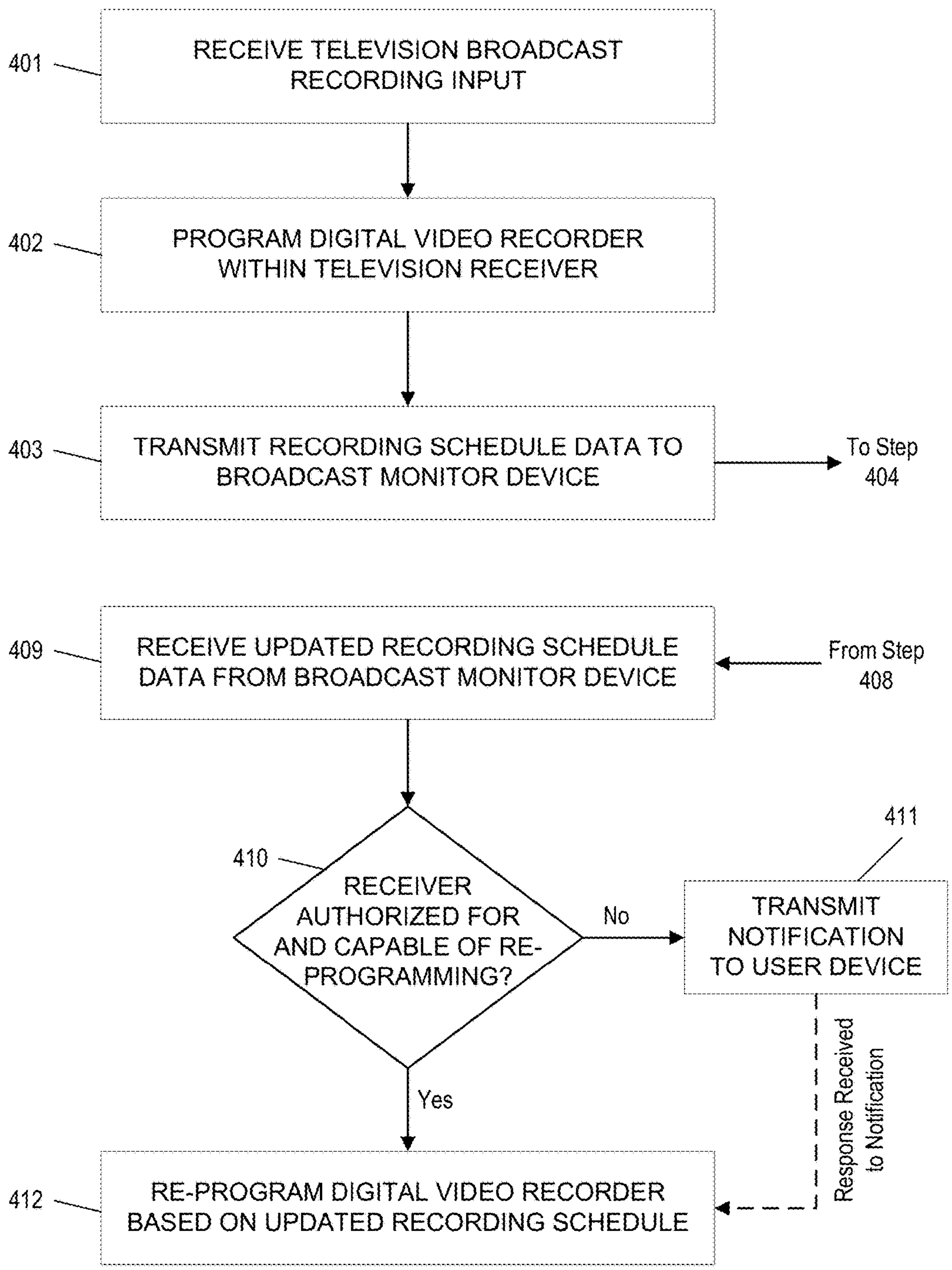
FIGS. 4A-4B show a flow diagram illustrating an example process of determining updated recording schedule data based on received time data for live television broadcasts, and reprogramming a digital video recorder based on the updated recording schedule data, according to one or more embodiments of the disclosure.
Figure 4B:
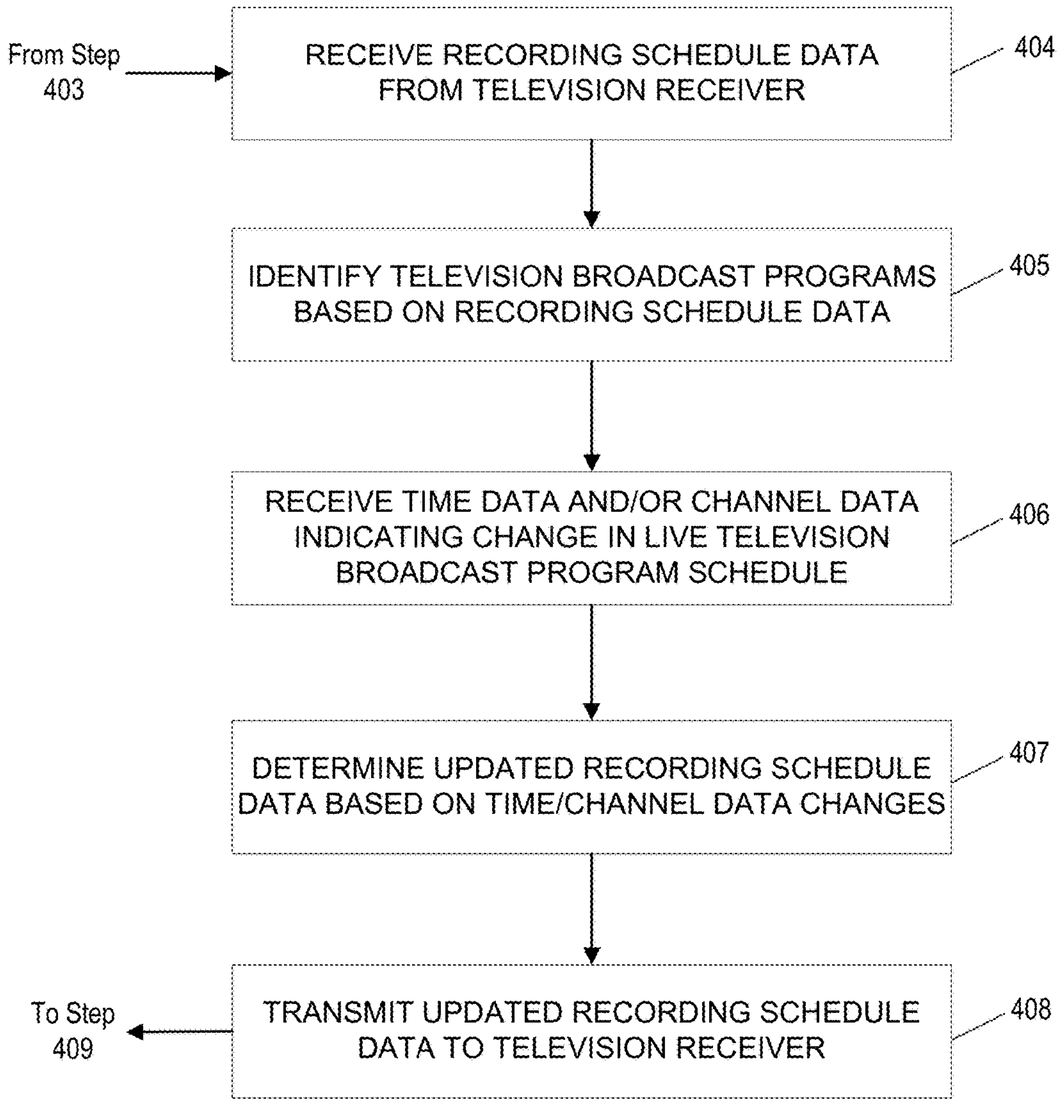

Referring now to FIGS. 4A and 4B, a flow diagram is shown illustrating an example process of determining updated recording schedule data based on received time data for live television broadcasts, and reprogramming a digital video recorder based on the updated recording schedule data. As described below, the steps in this process may be performed by one or more components in the television recording system 100 and corresponding computing environments described above. For instance, in some cases, a television receiver 130 may perform the steps shown in FIG. 4A (i.e., steps 401-403 and 409-412) and a television broadcast monitor device 110 may perform the steps shown in FIG. 4B (i.e., steps 404-408). In other cases, different combinations of devices may be used to perform the steps described below, or a single device (e.g., a television receiver 130) may perform all of the relevant steps for receiving time data corresponding to live television broadcasts, determining updated recording schedule data, and reprogramming a digital video recorder based on the updated recording schedule data. Moreover, it should be understood that the processes of determining updated recording schedule data based on received time data for live television broadcasts, dynamically reprogramming digital video recorders, and other features described herein need not be limited to the specific systems and hardware implementations described above in FIGS. 1-3, but may be performed within other computing environments comprising other combinations of hardware and software components. For example, this example process may be implemented not only within satellite television distribution systems, but also within terrestrial television distribution systems, telecommunications systems, Internet-based content distribution networks, cellular and other mobile networking systems, and the like.

In step 401, television broadcast recording input data may be received in response to user selections and/or user input regarding a set of television programs to be recorded by a television receiver 130. As noted above, step 401 may be performed by one or more television receivers 130 in some embodiments, including various types of set-top boxes, network routers, personal computers, and other user equipment capable of receiving, recording, and presenting television signals. For example, a television receiver 130 may receive user selections via a remote control device 170, user device 160, and/or an I/O subsystem of the television receiver 130 itself, corresponding one or more television programs designated for recording. In some cases, the television receiver 130 may provide graphical and/or programmatic interfaces (e.g., an EPG, search interface, API, etc.) to allow users to select television programs for recording via a local digital video recorder (DVR) device. The television program selections may include selections of individual programs, television series, televised movies, sporting events, newscasts, and the like, each of which may correspond to live television broadcasts programs or pre-corded programs. The selected television programs may be identified by program name and/or by the scheduled channel and scheduled start and end times for the program.

In step 402, the television receiver 130 may program a digital video recorder (DVR) device to record the television programs corresponding to the television broadcast recording input data received in step 401. As noted above, in some embodiments, the television receiver 130 may include an integrated DVR device and/or may be designed and configured to support DVR functionality. For example, television receiver 130 implemented as a set-top box, router, or home computer may be configured to receive television programs via broadcast television signals and/or data streams, and also record and store the identified television programs in a local storage system of the receiver 130. In other cases, DVR devices may implemented separately from the television receiver 130, whereby the television receiver 130 may program DVR device by initiating a communication session and transmitting a request or instruction to record the identified television programs. The DVR functionality for recording and storing a program may be based on the broadcast channel, scheduled start time, and scheduled end time for the program. For example, each television program to be recorded may be stored by the television receiver 130 as a data record including a channel identifier, date and start time identifiers, and a length or end time identifier (e.g., TIMER A; START 8 PM; END: 10 PM; Channel 2). In some cases, television receivers 130 may be capable of recording multiple television programs during the same time period, and therefore the DVR may be programmed to record multiple overlapping television programs in step 402.

In step 403, the television receiver 130 may transmit its recording schedule data to one or more television broadcast monitor devices 110. The recording schedule data may include similar data records to those described above, for example, including a television program name, broadcast channel identifier, scheduled program start time, scheduled program end time and/or scheduled program length, etc., for each program scheduled for recording by the television receiver 130. In some cases, a television receiver 130 may be configured to transmit recording schedule data for individual programs immediately after the DVR is programmed in step 402. In other cases, television receivers 130 may transmit batches of recording schedule data to a television broadcast monitor devices 110 in accordance with a periodic transmission schedule (e.g., hourly, daily, etc.), where such batches may include multiple television programs scheduled for recording (or updated) by the television receiver 130 since the transmission of the last data batch.

In step 404, the recording schedule data transmitted by the television receiver in step 403 may be received by one or more television broadcast monitor devices 110. In some embodiments, a television broadcast monitor device 110 may be implemented using a recording calibration component 120 having specialized hardware and/or software operating within a standalone computing device 110 of a television distribution system 100 or 200. Additionally or alternatively, television broadcast monitor devices 110 may be integrated into the existing hardware infrastructure of one or more television distribution systems. For example, a television broadcast monitor device 110 may be implemented using a specialized software service (e.g., broadcast recording calibration service 220) within a server 218 (and/or television provider 202) of a satellite television distribution system 200. Similar services and/or components may be implemented within other types of television distribution systems, including cable systems and other terrestrial television systems, as well as television distribution systems using telecommunications networks, IP-based networks such as the Internet, and cellular and other mobile network television distribution systems.

Additionally, in some embodiments, television broadcast monitor devices 110 need not operate within or be associated with any television distribution networks system 100 or 200. For instance, a television broadcast monitor device 110 may be operated within a computer network (e.g., the Internet) separate and independent from the satellite or cable television distribution system used to provide content to the television receivers 130. In such cases, television broadcast monitor devices 110 may be implemented within a social media server 143 or other third-party server, which may provide a television broadcast monitoring service to a plurality of client television receivers 130. Such services may provide some or all of the functionality of television broadcast monitor devices 110 described herein, using web-based, client-server, and other service-based technologies. In still other embodiments, the television broadcast monitor device 110 may be implemented as a software service within a user device 106, such as a home computer, smartphone, tablet computer, or the like.

In any of these examples, a single television broadcast monitor device 110 may receive recording schedule data from a single television receiver 130 or a plurality of television receivers 130. For example, television broadcast monitor device 110 within a television distribution network 100 or 200 may provide broadcast monitoring services to a plurality of subscriber receiver devices 130. Similarly, a monitor device 110 implemented as a web server or other computer network-based server may provide broadcast monitoring services to multiple receiver devices 130 across multiple different television distribution systems (e.g., satellite, cable, or Internet-based television distribution systems, etc.). Additionally, in some embodiments, a single television receiver 130 may be configured to transmit its recording schedule data to multiple different television broadcast monitor devices 110 (e.g., a first device 110 within a satellite television distribution system, a second device 110 within a terrestrial television distribution system, a third device 110 within a computer network-based television distribution system, a fourth device 110 with a social media server, and so on). In such embodiments, the multiple different television broadcast monitor devices 110 may each receive the complete recording schedule data from a television receiver 130, or may each receive specific partitions of the recording schedule data for which each respective device 110 has been configured or assigned to monitor.

In step 405, the television broadcast monitor device 110 may identify a number of television broadcast programs corresponding to the recording schedule data received in step 404. For example, if the monitor device 110 receives a set of television recording data records, each record having a start time, end time, and channel identifier, then the monitor device 110 may determine the television program(s) corresponding to the received records, based on electronic programming guide (EPG) data and/or other television broadcast schedule data. The identified television broadcast programs, which represent the programs that the television receiver 130 has been programmed or instructed to record, may include live television programs and/or pre-recorded television programs. For example, television receiver 130 may have been programmed to record various live television programs, including sporting events, live concerts or performances, live speeches or political events, live newscast, live television shows, etc. Other shows that a television receiver 130 may be programmed to record may include pre-recorded (or non-live) television programs, such as pre-recorded television shows, movies, and the like. As discussed below, scheduled recordings of both live and pre-recorded shows may be affected by changes to scheduled live television broadcasts.

In step 406, the television broadcast monitor device 110 may receive data indicating changes to a live broadcast television program schedule. For example, television broadcast monitor device 110 may receive data indicating that a live sporting event, live speech, or other live television program is starting earlier or later than its scheduled time, ending earlier or later than its scheduled time, or that some or all of the live program will be broadcast on a different channel then its scheduled broadcast channel. In some cases, the received data may indicate that a live television program has exceeded (or will exceed) its scheduled broadcast time and that the remainder of the live program will be broadcast on a separate channel. As another example, the received data may indicate that an unscheduled live program (e.g., a breaking news broadcast) is being (or will be) broadcasted instead of a previously scheduled program.

As illustrated by these examples, the data received in step 406 may be received before or during the broadcast of the live television program. For example, a delayed start to a live event or change in broadcast channel may be determined and transmitted in some cases before the start of the live television program, while an early or delaying ending to a live event or the broadcasting of an unscheduled live program might not be determined until the during the live broadcast of the program has commenced. Additionally, it should be understood that the live television programs for which updated time data and/or channel data is received in step 406 need not be the same television programs identified in step 405. As discussed below, schedule changes for live broadcast television programs may affect the broadcast schedules of other programs as well, such as programs airing at the same time on different channels, or programs airing on the same channel at a different time.

The updated time data and/or updated channel data for live broadcast television programs may be received from one or more data sources, such as data sources 141-143 or any other live television broadcast data source discussed herein. For example, a satellite television provider server 141 or a cable television provider server 142 may transmit updates to one or more television broadcast monitor devices 110, indicating the changes in the broadcast times or channels of any live television programs that these television distribution systems are broadcasting. For example, when a sporting event, concert, political event, or other live television program ends early or runs long, a television provider server may transmit a signal to a set of subscriber television broadcast monitor devices 110, the signal identifying the live television program and the updated time and/or channel data for the broadcast. In some cases, the television broadcast monitor device 110 need not receive a separate signal from a television provider server 141 or 142 identifying the schedule change, but instead may analyze the television signals directly to determine whether any changes have occurred to live television broadcast schedule. For instance, the television broadcast monitor device 110 may analyze one or more received television signals and/or data streams to identify embedded metadata, broadcast source data, and/or other broadcast transmission characteristics into order to determine when a particular live television broadcast has started, ended, switched channels, etc.

Social media servers 143 and/or other third-party servers also may provide updated schedule data for live broadcast programs in some embodiments. For example, a social media server 143 may receive updates regarding live broadcast television programs from system administrators or dedicated viewers/monitors. In other examples, social media servers 143 may collect and analyze user interactions with the social media system (e.g., user posts, tweets, feeds, comments, reviews, blogs, etc.) in order to determine that a live television event has started early or late, has ended early or late, is airing on another channel, etc. Other independent and third-party data sources may collect, analyze, and provide live television updates to subscriber monitor devices 110, and/or directly to television receivers 130 or user devices 160 as discussed below. In still other examples, certain user devices 160 may include live television broadcast monitoring applications which allow users to provide real-time input indicating when a change has occurred to a live television broadcast schedule. In such examples, the software application executing on the user device 160 may transmit the updated data to one or more television broadcast monitor devices 110 and/or directly to one or more associated television receivers 130.

In step 407, the television broadcast monitor device 110 may determine updated recording schedule data for the television receiver(s) 130, based on the television programs identified for recording in step 405, and the changes one or more live broadcast programs received or determined in step 406. Specifically, the television broadcast monitor device 110 may determine a set of television programs whose scheduled broadcasts may be affected by the changes to the live broadcast programs received or determined in step 406, and also how the broadcast schedules for those programs may be affected (e.g., different broadcast start times, end times or durations, and/or channels). The set of programs affected by the changes to the live broadcast programs then may be compared to the set of programs scheduled for recording by one or more television receiver 130. In some cases, the determination of how a broadcast schedule for an affected program may change may be performed using similar or identical techniques to those discussed above in step 406. For example, the television broadcast monitor device 110 may receive updated starting time, ending time, and/or channel data for any affected television programs from a television distribution system server 141 or 142, social media server 143, user device 160, or other data source. For instance, a satellite television provider server 141 and/or cable television provider server 142 may transmit data to a set of subscriber monitoring devices 110 indicating that a live program is running long, and that the program(s) scheduled to air after the live program (1) will be broadcast in its entirety on the same channel after the conclusion of the live program, (2) will be broadcast on a different channel at its scheduled time, or (3) will be broadcast on the same channel but will be cut-short by the amount of time that the preceding live program runs long. As discussed in the examples below, the updated program recording schedule data generated by the monitoring device 110 and programmed into the DVR by the television receiver 130 may be different in each of these cases.

In some embodiments, instead of (or in addition to) receiving a data transmission with updated time and channel data from a data source 141-143, the television broadcast monitor device 110 may determine how the broadcast schedules for affected programs may change by analyzing the television signals and/or data streams, as described above. In still other embodiments, the television broadcast monitor device 110 may be programmed to determine updated recording schedule data for one or more television receivers 130 in step 407, without knowing exactly how the broadcast schedules for affected programs may change. For example, the television broadcast monitor device 110 may receive data indicating that live program is running long, but might not know which of the three options listed in the previous paragraph will be used for broadcasting a television program scheduled after the live program. In such cases, the monitor device 110 may be programmed with a default option (e.g., delaying the start time and end time of the following program by the amount of time that the live program runs long), or alternatively may be configured to prompt a user device 160 to select an option.

Referring briefly to FIGS. 5A-5G, several examples will now be discussed to illustrate possible scenarios in which a television broadcast monitor device 110 may determine updated recording schedule data in step 407. In a first example, illustrated in FIGS. 5A and 5B, the recording schedule data received in step 404 by a television broadcast monitor device 110 may include a record corresponding to a live broadcast television program. In step 406, the monitor device 110 may determine that the live program has completed (or is going to complete) earlier than its scheduled end time, and thus that the recording data for the live program should be updated to shorten the recording time based on the updated end time or program length data, as shown in FIG. 5A. Therefore, in this example, the monitor device 110 may determine updated recording schedule data for a television receiver 130 which records less overall television content and thus saves memory within the DVR storage of the receiver 130. In other cases, such as the example shown in FIG. 5B, the monitor device 110 may determine in step 406 that the live program has started (or is going to start) earlier than its scheduled start time, and thus the recording schedule data for the live program should be updated to adjust forward the start time and end time accordingly. Therefore, in this example, the monitor device 110 may determine updated recording schedule data for a television receiver 130 with adjusted recording times to record the desired program in its entirety.

In a second example, illustrated in FIG. 5C, the recording schedule data received in step 404 may include records corresponding to a live program and one or more television programs scheduled to air after the live program. In step 406, the monitor device 110 may determine that the live program is running longer (or is going to run longer) than its scheduled end time, and thus that the recording data for the following pre-recorded programs should be updated by adjusting back the starting time and ending time for the pre-recorded programs. The ending time for the live program also may be adjusted back, if it is scheduled for recording as well. Therefore, in this example, the monitor device 110 may determine updated recording schedule data for a television receiver 130 with adjusted recording times so that each desired television program may be recorded in its entirety and within a single recording file by the television receiver 130.

In a third example, illustrated in FIGS. 5D and 5E, the recording schedule data received in step 404 may include a record corresponding to a pre-recorded television program. In step 406, the monitor device 110 may determine that an unscheduled live broadcast (e.g., a breaking news or weather alert, etc.) has interrupted the program scheduled for recording, and that the scheduled recording of the television program should be temporarily paused until the completion of the unscheduled live broadcast. In some cases, such as the example shown in FIG. 5D, the monitor device 110 may determine in step 406 that the scheduled program will be shown in its entirety after the live broadcast interruption. In other cases, such as the example shown in FIG. 5E, the monitor device 110 may determine in step 406 that the scheduled program will end at its scheduled time and thus will not be shown in its entirety because of the live broadcast interruption. In both examples, the monitor device 110 may determine updated recording schedule data for the television receiver 130 which records the entire aired portion of the television program but none of the live broadcast interruption. In other examples, a user or administrator may configure the monitor device 110 to record any interrupting live broadcasts as well, either embedded within the scheduled programs or stored/labeled as separate recording files within the DVR program listings of the television receiver 130.

In a fourth example, illustrated in FIG. 5F, the recording schedule data received in step 404 may include a record corresponding to a first live broadcast television program and a second television program scheduled to air after the live program. In step 406, the monitor device 110 may determine that the live program is running longer (or is going to run longer) than its scheduled end time, and thus that the recording data for the live program should be updated by adjusting back the ending time for the live program. Additionally, the monitor device 110 may determine that the program scheduled to air after the live program will be aired on a different channel at its regularly scheduled time. Thus, the recording data for the program following the live program should be updated to change the recording channel, so that both programs may be recorded in their entirety on the proper channels by the television receiver 130.

In a fifth example, illustrated in FIG. 5G, the recording schedule data received in step 404 may include a record corresponding to a first live broadcast television program and a second television program scheduled to air after the live program. In step 406, the monitor device 110 may determine that the first live program is running longer (or is going to run longer) than its scheduled end time, and that the conclusion of the first live program will be aired on a different channel. Therefore, the monitor device 110 may determine that the recording data for the second program following the first live program may be kept the same, but that an additional recording record may be created to record the conclusion of the first live program on the new channel.

In step 408, the television broadcast monitor device 110 may transmit the updated recording schedule data determined in step 407 back to the television receiver 130. In some cases, the data formats and techniques for transmitting/receiving the updated recording schedule data to the television receiver 130 may be similar or identical to the data formats and techniques used for transmitting/receiving the recording schedule data from the television receiver 130 in steps 403-404. For example, data records may be transmitted identifying specific television programs by channel, start time, and end time (or program length). Additionally or alternatively, the data records transmitted may include program title names or other identifiers.

Additionally, as noted above, the transmissions of recording schedule data in steps 403-404 and return transmissions of updated recording schedule data in steps 408-409 may be one-to-one, one-to-many, or many-to-one in various different embodiments. For example, in step 403, a single television receiver 130 may transmit its entire recording schedule data to multiple different monitor devices 110, such as one or more television provider servers 141-142 and one or more additional social media or third-party monitor services 143. In other embodiments, a single television receiver 130 may partition its recording schedule data and transmit different portions to different monitor devices 110. For instance, the recording schedule data relating to channels and/or programs provided by a satellite television provider may be transmitted to a monitor device 110 associated with and/or integrated within the satellite television provider server 141, a second set of the recording schedule data relating to channels and/or programs provided by a separate cable television provider may be transmitted to a monitor device 110 associated with and/or integrated within the cable television provider server 142, a third set of the recording schedule data relating to channels and/or programs provided by a separate Internet-based television provider may be transmitted to a monitor device 110 associated with and/or integrated within the Internet-based television provider, and so on. Additionally, in some embodiments, the television receiver 130 may transmit an overlapping set of all of its recording schedule data to one or more social media or other third-party servers 143 for backup and/or redundancy purposes.

Similarly, return transmissions of updated recording schedule data in steps 408-409 also may be one-to-one, one-to-many, or many-to-one in various different embodiments. For example, a television broadcast monitor device 110 may determine updated recording schedule data specifically for an individual television receiver 130 in step 407, and may transmit the updated recording schedule data to the specific television receiver 130 only in step 408. Thus, in this example, each television receiver 130 would not receive a transmission of updated recording schedule data unless one of its own scheduled recordings was affected. In other examples, a television broadcast monitor device 110 may determine updated recording schedule data for all upcoming television programs, and may transmit the updated recording schedule data to multiple different subscriber television receivers 130 in step 408. Thus, in this example, each television receiver 130 may receive transmissions of updated recording schedule data even if its own scheduled recordings was not affected.

In step 409, the television receiver 130 receives the updated recording schedule data from the television broadcast monitor device 110. As noted above, in some cases a television receive 130 may transmit recording schedule data to and may receive updated recording schedule data from multiple different monitor devices 110, for example, dedicated monitor devices 110 for satellite television systems, cable television systems, and Internet-based television systems, and television broadcast monitor devices 110 implemented within a social media servers and/or other third-party servers, etc.

In step 410, the television receiver 130 may determine whether it is authorized for and capable of reprogramming its digital video recorder (DVR) systems in accordance with the updated recording scheduled data received in step 409. For example, in scenarios such as those discussed in reference to FIGS. 5F and 5G, the updated recording schedule data received in step 409 may include different sets of channels to be recorded other than the original channels specified by the user in step 401. In some such cases, the television receiver 130 might not be authorized to receive the updated channels. For instance, a live sports program on Sports Network #1 that runs over its scheduled air time may cause either the final portion of the live program itself, or the program scheduled to air after the live sport program, to be aired on Sports Network #2. In this case, if the user has subscribed to a television package that does not include Sports Network #2, then the television receiver 130 may determine it is not authorized to display or record programs in accordance with the updated recording scheduled data (410: No).

In other examples, the updated recording schedule data received in step 409 may require the television receiver 130 to simultaneously record more programs than it is capable of (e.g., based on the number of tuners within the television receiver 130). In still other examples, the updated recording schedule data received in step 409 may require the television receiver 130 to record more television content and/or higher-resolution television content than can be stored in the memory of the receiver's 130 associated DVR system. As another example, the updated recording schedule data received in step 409 may require the television receiver 130 to violate a user-specified rule or preference for displaying/recording television content, such as time-based rules (e.g., no television programs to be recorded after 10:00 pm) and/or channel-based rules (e.g., all content from channel 18 to be blocked), etc. In any of these examples, the television receiver 130 may determine it is not capable of recording the television programs in accordance with the received updated recording scheduled data (410: No).

In step 411, if the television receiver 130 determines that it is not authorized for or capable of recording the television programs in accordance with the received updated recording scheduled data (410: No), then the television receiver 130 may transmit a notification to an associated user device 160 to inform the user of the conflict and/or potential recording failure. As noted above, the user device 160 may include one or more smartphones, personal computers, tablet computers, and other devices associated with the television receiver 130 and/or television broadcast subscriber accounts. Alternatively or additionally, the television receiver 130 may retrieve various communication techniques or addresses in step 411, such as email addresses, phone numbers, chat application usernames/handles, and the like, to be used to provide the user notifications. In some cases, the notifications transmitted to user devices 106 may include interactive user interface components that may allow the user to select an option for handling the potential recording failure. For instance, the notification in step 411 may provide an interactive user interface that allows the user to update the program recording settings of the television receiver 130, change various user-specified rules and preferences, delete one or more stored television programs to free up DVR memory, and/or directly contact a television provider server 141 or 142 to resolve the conflict.

In some embodiments, instead of or in addition to providing a user notification in step 411, the television receiver 130 may transmit a request to a television broadcast monitor device 110 and/or directly to a television provider server 141 or 142 to resolve the recording conflict. For example, if the updated recording schedule data received in step 409 includes new channels that the television receiver 130 is not authorized to receive, then the receiver 130 may contact the monitor device 110 and/or provider server 141 or 142 directly to request a temporary exception that allows the receiver 130 to record the unauthorized channels. Additionally, the television receiver 130 may automatically suspend or alter certain internal recording rules (e.g., channel-based and/or time-based rules) in some embodiments, to allow the DVR to be programmed in accordance with the updated recording schedule data.

In step 412, the television receiver 130 may program its associated digital video recorder (DVR) device(s) or system (s) to record the television programs corresponding to the updated recording schedule data received in step 409. The techniques used to reprogram an integrated DVR device or other DVR functionality associated with the television receiver 130 may be similar or identical to the DVR programming techniques discussed above in step 402. As shown in this example, the reprogramming of the DVR devices or systems in step 412 may be performed after determining that the television receiver 130 is authorized for and capable of recording the requested television programs in accordance with the received updates (410: Yes). Additionally or alternatively, a television receiver 130 may reprogram its associated DVR devices and systems in step 412 after receiving a user response to an interactive notification in step 411. For example, if a conflict and potential recording error is determined in step 410, the user may respond to a notification in step 411 via a user device 160 to resolve the conflict by manually modifying a recording schedule, reprioritizing a program recording, etc. Such user responses to notifications in step 411 may be received by the television receiver 130 and used to reprogram the DVR in step 412 in accordance with the user responses.

Figure 6:
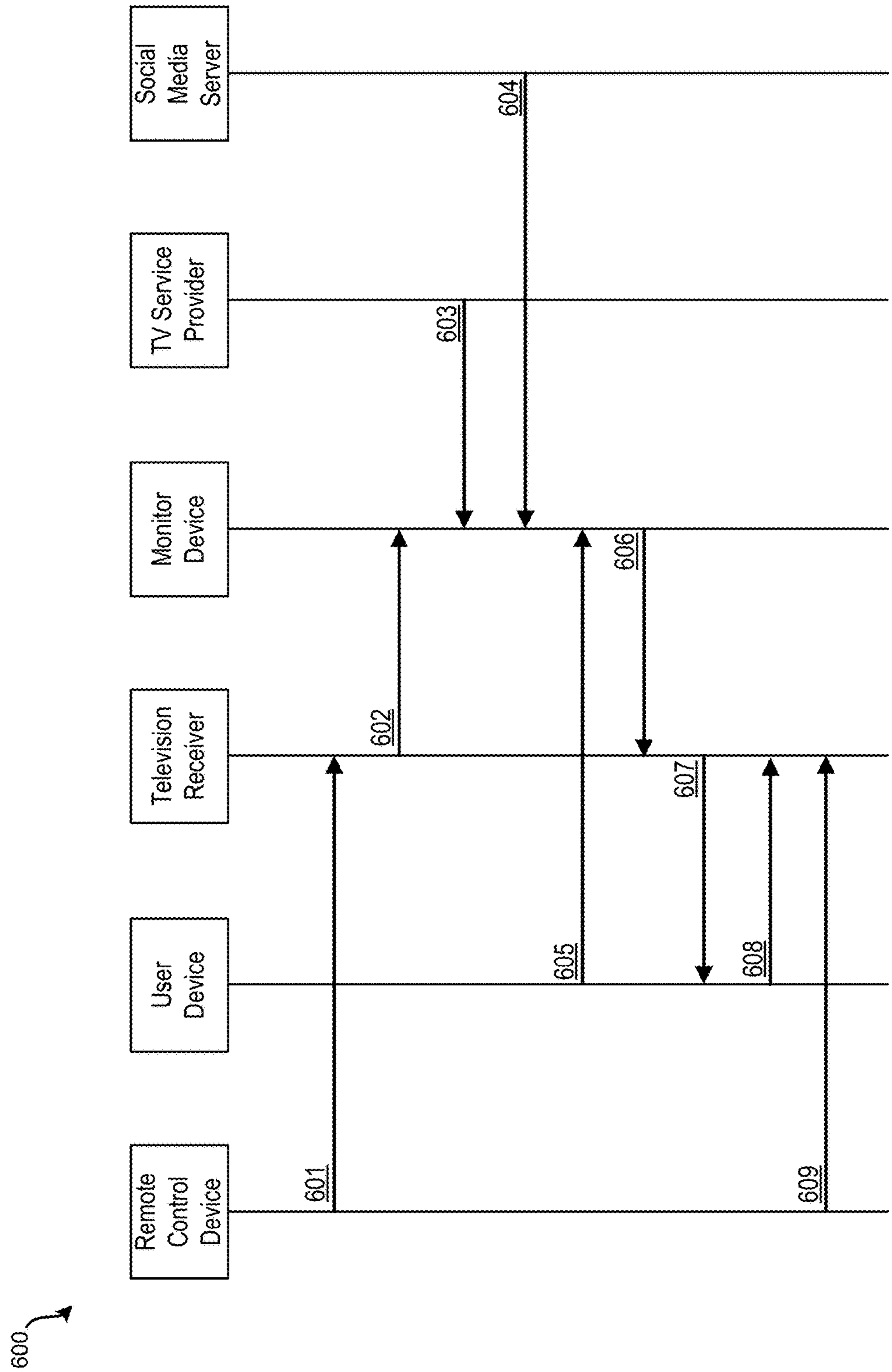
FIGS. 6 and 7 are example sequence diagrams illustrating processes of programming and reprogramming a digital video recorder based on updated recording schedule data for live television broadcasts, according to one or more embodiments of the disclosure.

Referring now to FIG. 6, a first example is shown of a sequence diagram illustrating a process of programming and reprogramming DVR devices and/or systems associated with a television receiver 130, based on receiving updated recording schedule data for one or more live television broadcasts. Sequence diagram 600 may represent, in some embodiments, a similar process to those described above in reference to FIGS. 4A-4B. For example, communication 601 may correspond to step 401, in which user selections specifying television programs to be recorded may be made via a remote control device 170 and transmitted to a television receiver 130. Communication 602 may correspond to step 403, in which a television receiver 130 may transmit its recording schedule data to a television broadcast monitor device 110. Communications 603, 604, and 605 may correspond to step 406 in multiple different scenarios, in which the television broadcast monitor device 110 receives data from various different data sources indicating changes to a live broadcast television program schedule. As discussed above, monitor devices 110 in different implementations may receive live broadcast schedule change data from television servers (e.g., communication 603), and from social media servers and/or other third-party servers (e.g., communication 604). Additionally, in some cases, monitor devices 110 may receive live broadcast schedule change data from various user devices 160. For example, a user who is not currently near the television receiver 130 and thus cannot easily reprogram the receiver 130, may become aware of a change in a live television broadcast schedule. Such a user may be watching television elsewhere, listening to the same live event on the radio, or may learn about the change some other way. In response, the user may provide input via a user device 160 which may transmit the live television broadcast schedule change data to the monitor device 110 (e.g., communication 605). Communication 606 may correspond to step 408, in which the television broadcast monitor device 110 transmits the updated recording schedule data that it has determined back to the television receiver 130. Communications 607 and 608 may correspond to (optional) step 411, in which a notification is transmitted by the television receiver 130 to a user device 160, and a user response (optional) is transmitted back to the television receiver 130. Additionally or alternatively, in some embodiments, such notifications may be displayed onto a presentation device 150, and the user responses to the notifications may be received via a remote control device (e.g., communication 609).

Figure 7:
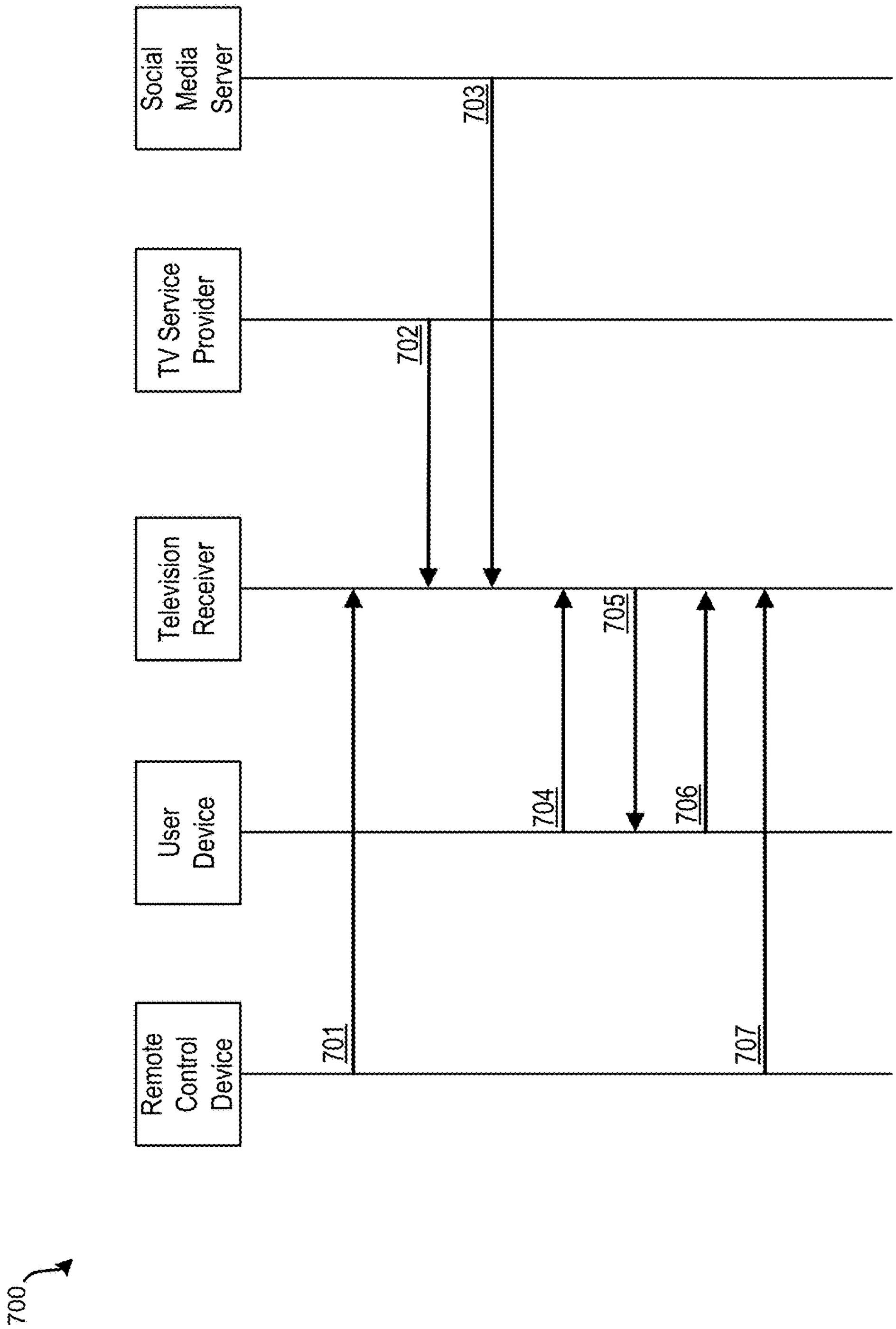

Referring now to FIG. 7, a second example is shown of a sequence diagram illustrating a process of programming and reprogramming DVR devices and/or systems associated with a television receiver 130, based on receiving updated recording schedule data for one or more live television broadcasts. Sequence diagram 700 may represent, in other possible embodiments, a similar process to those described above in reference to FIGS. 4A-4B. In contrast to sequence diagram 600, the television broadcast monitor device 110 in this example might not be implemented as a standalone computing device 110. Instead, as discussed above in various examples, a television broadcast monitor device 110 may be integrated into the existing hardware infrastructure of television receivers 130, television distribution system servers 141 and 142, system servers 218 and/or television providers 202, and the like. For example, in sequence diagram 700, a television broadcast monitor device 110 may be implemented as a broadcast recording calibration service 220 and/or other specialized hardware or software components within a television receiver 130. Accordingly, in embodiments corresponding to sequence diagram 700, all steps 401-402, 405-407, and 410-412 may be performed by a single device, which in this case may be a television receiver 130. In this example, communication 701 may correspond to step 401, in which user selections specifying television programs to be recorded may be made via a remote control device 170 and transmitted to a television receiver 130. Communications 702, 703, and 704 may correspond to step 406 in multiple different scenarios, in which the monitor device functionality 110 within the television receiver 730 receives data from various different data sources indicating changes to a live broadcast television program schedule. As discussed above, monitor devices 110 in different implementations may receive live broadcast schedule change data from television servers (e.g., communication 702), from social media servers and/or other third-party servers (e.g., communication 703), and/or from user devices 160 (e.g., communication 704). Communications 705 and 706 may correspond to (optional) step 411, in which a notification is transmitted by the television receiver 130 to a user device 160, and a user response (optional) is transmitted back to the television receiver 130. Additionally or alternatively, in some embodiments, such notifications may be displayed onto a presentation device 150, and the user responses to the notifications may be received via a remote control device 170 (e.g., communication 707).

Figure 8:
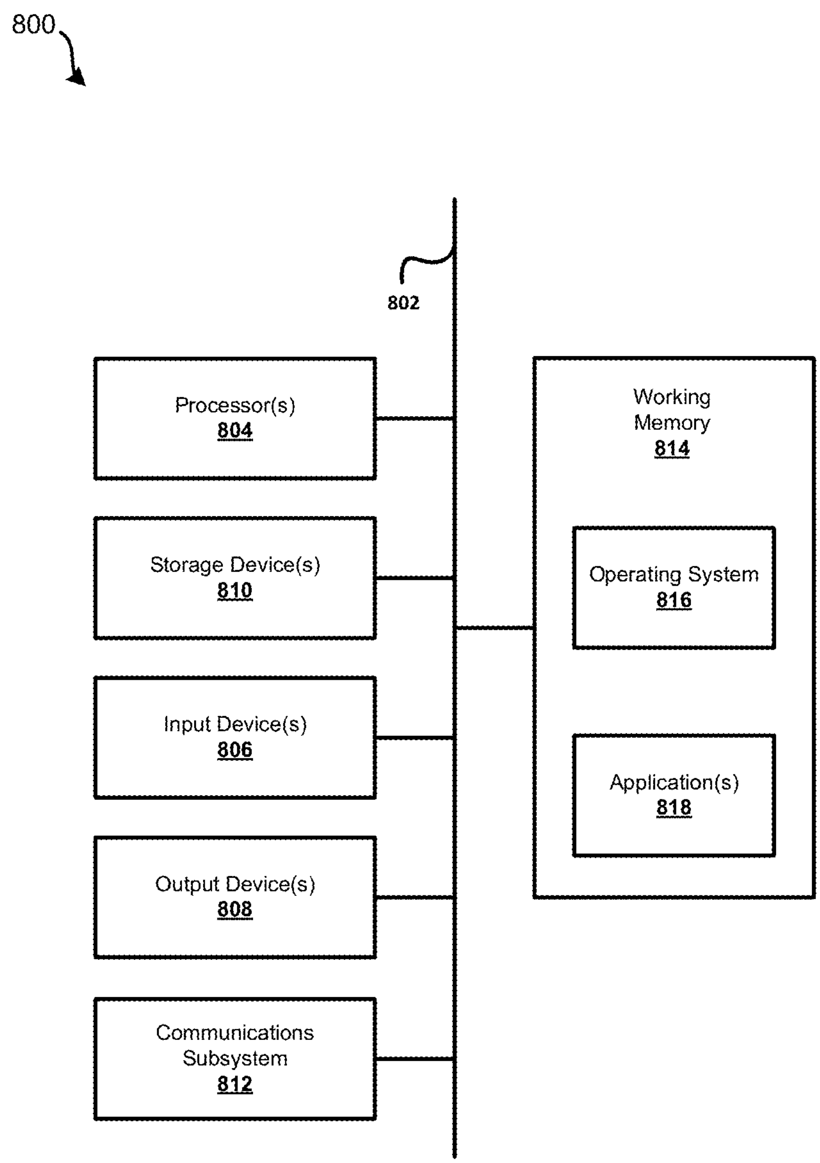
FIG. 8 is a block diagram illustrating an example computing system upon which various features of the present disclosure may be implemented In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

Referring now to FIG. 8, an example is shown of a computer system or device 800 in accordance with the disclosure. Examples of computer systems or devices 800 may include systems, controllers, monitors, or the like, an enterprise server, blade server, desktop computer, laptop computer, tablet computer, personal data assistant, smartphone, gaming console, set-top box, television receiver, and/or any other type of machine configured for performing calculations. Any particular one of the previously-described computing devices may be wholly or at least partially configured to exhibit features similar to the computer system 800, such as any of the respective elements or components of at least FIGS. 1-3. In this manner, any of one or more of the respective elements of those figures may be configured and/or arranged, wholly or at least partially, for programming and dynamically calibrating (e.g., reprogramming or reconfiguring) digital video recordings of television broadcasts based on analyses of time data corresponding to live television broadcasts. Still further, any of one or more of the respective elements of at least FIG. 1-3 may be configured and/or arranged to include computer-readable instructions that, when executed, instantiate and implement various functionality described herein (e.g., one or more broadcast recording calibration services 220).

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 812 may permit data to be exchanged with a network (such as the network described below, to name one example), other computer systems, and/or any other devices described herein. In many examples, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 800) to perform methods in accordance with various examples of the disclosure. According to a set of examples, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804. It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television broadcast recording system, comprising:

a television receiver, comprising:
- one or more tuners;
- a digital video recorder;
- one or more processors; and
- memory communicatively coupled with and readable by the one or more processors and having stored therein processor-readable instructions which, when executed by the one or more processors, cause the television receiver to:
  - receive data from a user controller device identifying a television program to record from a television broadcast;
  - in response to receiving the data from the user controller device, program the digital video recorder to record the identified television program;
  - in response to programming the digital video recorder to record the identified television program, transmit recording schedule data to a television broadcast monitor device via the Internet, the recording schedule data indicating only the identified television program;
  - receive updated recording schedule data from the television broadcast monitor device for only the identified television program based on the transmitted recording schedule data, wherein:
    - the updated recording schedule data comprises at least one of: an updated start time, an updated end time, or an updated broadcast channel for the identified television program; and
  - in response to receiving the updated recording schedule data for only the identified television program from the television broadcast monitor device, reprogram the digital video recorder to record the identified television program in accordance with the at least one of the updated start time, updated end time, or updated broadcast channel for the identified television program; and a television broadcast monitor device that is remote from the television receiver and accessible via the Internet, the television broadcast monitor device comprising:
- one or more processors; and
- memory communicatively coupled with and readable by the one or more processors and having stored therein processor-readable instructions which, when executed by the one or more processors, cause the television broadcast monitor device to:
- receive the recording schedule data from the television receiver;

determine the identified television program as being broadcast as a live television broadcast based on the received recording schedule data;

receive time data corresponding to the live television broadcast, the time data indicating a change to at least one of: a start time, an end time, or a broadcast channel of the identified television program being broadcast as the live television broadcast;

determine the updated recording schedule data based on the time data corresponding to the live television broadcast, wherein the updated recording schedule data corresponds to only the identified television program; and transmit the updated recording schedule data to the television receiver via the Internet in response to receiving the recording schedule data from the television receiver and determining the updated recording schedule data.

2. The television broadcast recording system of claim 1, wherein the time data comprises data indicating an updated end time for a first live television program, the updated end time being different from a scheduled end time of the first live television program.

3. The television broadcast recording system of claim 2, wherein determining the updated recording schedule data comprises:

determining an updated start time for a second television program scheduled for broadcast after the first live television program, based on the received updated end time for the first live television program.

4. The television broadcast recording system of claim 2, wherein the received updated end time for the first live television program is later than the scheduled end time of the first live television program, and wherein determining the updated recording schedule data comprises determining a new broadcast channel for a second television program scheduled for broadcast after the first live television program.

5. The television broadcast recording system of claim 4, the memory of the television receiver having stored therein further processor-readable instructions which, when executed by the one or more processors, cause the television receiver to:

determine whether the television receiver is authorized to receive the new broadcast channel for the second television program; and upon determining that the television receiver is not authorized to receive the new broadcast channel for the second television program, transmit a notification from the television receiver to a mobile device associated with the television receiver, the notification identifying the new broadcast channel for the second television program.

6. The television broadcast recording system of claim 1, wherein transmitting the recording schedule data to the television broadcast monitor device comprises:

transmitting, by the television receiver, a television program schedule record, each television program schedule record identifying at least a start time, an end time, and a broadcast channel.

7. The television broadcast recording system of claim 1, the memory of the television receiver having stored therein further processor-readable instructions which, when executed by the one or more processors, cause the television receiver to:

determine, based on the updated recording schedule data, whether the digital video recorder of the television receiver is capable of recording the identified television programs; and upon determining that the television receiver is not capable of recording the identified television programs in accordance with the updated recording schedule data, transmit a notification to a mobile device associated with the television receiver.

8. A method, comprising:

receiving, by a television receiver device, data identifying a live broadcast television program to record from a television broadcast;

programming, by the television receiver device, a digital video recorder associated with the television receiver device to record the identified live broadcast television program, in response to receiving the data;

in response to programming the digital video recorder to record the identified live broadcast television program, transmitting, by the television receiver device, via the Internet, recording schedule data to a television broadcast monitor device, the recording schedule data indicating the identified live broadcast television program;

receiving, by the television receiver device, a television broadcast signal from a television service provider, the television broadcast signal including the identified live broadcast television program;

receiving, by the television receiver device, updated recording schedule data for only the identified live broadcast television program, transmitted in response to the recording schedule data being received by the television broadcast monitor device, wherein the updated recording schedule data comprises at least one of an updated start time, an updated end time, or an updated broadcast channel for the identified live broadcast television program; and in response to receiving the updated recording schedule data, reprogramming, by the television receiver device, the digital video recorder to record the identified live broadcast television program, using the at least one of the updated start time, updated end time, or updated broadcast channel.

9. The method of claim 8, wherein the television receiver device comprises one or more tuners configured to receive the television broadcast signal from at least one of a satellite television service provider device or a cable television service provider device.

10. The method of claim 8, wherein the television receiver device comprises one or more network interfaces configured to receive the television broadcast signal via at least one of a wide area computer network or a wireless telecommunications network.

11. The method of claim 8, wherein the television broadcast monitor device comprises a mobile device associated with the television receiver device, and wherein receiving the updated recording schedule data from the television broadcast monitor device comprises receiving data input by a user via the mobile device indicating at least one of an updated start time, an updated end time, or an updated broadcast channel for a first live television program.

12. The method of claim 8, wherein the television broadcast monitor device comprises at least one of a device associated with a satellite television service provider, a device associated with a cable television service provider, or a device associated with a social media service provider.

13. The method of claim 8, wherein receiving the updated recording schedule data comprises:

receiving and decoding one or more metadata tags embedded into the television broadcast signal, the embedded metadata tags identifying at least one of a starting point or ending point of a first live television program.

14. The method of claim 8, wherein the updated recording schedule data comprises the updated end time for a first live television program, the updated end time being different from a previously scheduled end time of the first live television program.

15. The method of claim 14, wherein reprogramming the digital video recorder comprises:

determining an updated start time for a second television program scheduled for broadcast after the first live television program, based on the received updated end time for the first live television program.

16. The method of claim 14, wherein the received updated end time for the first live television program is later than the scheduled end time of the first live television program, and wherein reprogramming the digital video recorder comprises:

determining a new broadcast channel for a second television program scheduled for broadcast after the first live television program.

17. The method of claim 16, further comprising:

determining whether the television receiver device is authorized to receive the new broadcast channel for the second television program; and upon determining that television receiver device is not authorized to receive the new broadcast channel for the second television program, transmit a notification to a mobile device associated with the television receiver device, the notification identifying the new broadcast channel for the second television program.

18. A method comprising:

receiving, by a television broadcast monitor device, via the Internet, recording schedule data from a television receiver device in response to the television receiver device being programmed to record a television program, the recording schedule data comprising a start time, an end time, and a broadcast channel indicating only the television program;

receiving, by the television broadcast monitor device, a television broadcast signal from a television service provider, the television broadcast signal including one or more live broadcast television programs;

identifying, by the television broadcast monitor device and based on the received recording schedule data, a first live broadcast television program within the television broadcast signal, the first live broadcast television program having a scheduled start time, a scheduled end time, and a scheduled broadcast channel;

receiving, by the television broadcast monitor device, time data indicating a change to at least one of: a scheduled start time, a scheduled end time, or a scheduled broadcast channel of the first live broadcast television program;

determining, by the television broadcast monitor device, updated recording schedule data based on the received time data, wherein the updated recording schedule data corresponds to only the first live broadcast television program; and transmitting, by the television broadcast monitor device, via the Internet, the updated recording schedule data for only the first live broadcast television program to the television receiver device in response to receiving the recording schedule data from the television receiver device.

19. The method of claim 18, wherein the received time data indicates an updated end time for the first live broadcast television program, wherein the updated end time is later than the scheduled end time of the first live broadcast television program, and wherein determining the updated recording schedule data comprises:

determining a new broadcast channel for a second television program scheduled for broadcast after the first live broadcast television program.

* * * * *